United States Patent

Hrovat et al.

[11] Patent Number: 5,696,681
[45] Date of Patent: Dec. 9, 1997

[54] BRAKE STEER VEHICLE DYNAMICS CONTROL INTERVENTION

[75] Inventors: Davorin Hrovat, Dearborn; Anthony T. Ander, Plymouth, both of Mich.

[73] Assignee: Ford Global Technologies, Inc., Dearborn, Mich.

[21] Appl. No.: 465,282

[22] Filed: Jun. 5, 1995

[51] Int. Cl.[6] ............................................. B60T 8/88
[52] U.S. Cl. .......................... 364/426.01; 364/426.021; 303/122; 303/DIG. 7; 340/443
[58] Field of Search .................. 364/426.01, 426.021, 364/426.038; 180/197; 303/140, 146, 147, 170, 177, 178, 122, DIG. 7; 340/442, 443, 444

[56] References Cited

U.S. PATENT DOCUMENTS

| | | | |
|---|---|---|---|
| 4,715,248 | 12/1987 | Gant | 74/710 |
| 4,777,611 | 10/1988 | Tashiro et al. | 364/565 |
| 4,925,254 | 5/1990 | Holst | 364/426.02 |
| 5,015,042 | 5/1991 | Yoshino | 303/170 |
| 5,178,231 | 1/1993 | Watanabe et al. | 180/197 |
| 5,192,929 | 3/1993 | Walker et al. | 340/444 |
| 5,197,566 | 3/1993 | Watanabe et al. | 364/426.02 |
| 5,206,808 | 4/1993 | Inoue et al. | 364/426.01 |
| 5,233,528 | 8/1993 | Phipps et al. | 364/426.02 |
| 5,292,184 | 3/1994 | Takata | 364/426.02 |
| 5,345,217 | 9/1994 | Prottey | 340/442 |

OTHER PUBLICATIONS

"Theory and Experiments of Tire Blow-out Effects and Hazard Reduction Control for Automated Vehicle Lateral Control System"—Proceedings of the American Control Conference, Baltimore, Maryland, Jun. 1994, pp. 1207-1209—S. Patwardhan, m. Tomizuka, W. Zhang and P. Devlin.

Primary Examiner—Gary Chin
Attorney, Agent, or Firm—Mark L. Mollon

[57] ABSTRACT

An electronic controller applies a braking force to selected wheels when sudden tire rupture is detected. A tire rupture signal indicative of whether a tire on the vehicle has ruptured is generated. Signals corresponding to a desired trajectory of the and the actual trajectory of the vehicle are calculated. Corresponding brake actuator signals are generated and applied to appropriate brakes of the vehicle, controlling the actual trajectory of the vehicle.

12 Claims, 5 Drawing Sheets

BRAKE STEER VEHICLE DYNAMICS CONTROL INTERVENTION

FIELD OF THE INVENTION

This invention is directed to techniques for controlling a vehicle after sudden tire rupture. More particularly, the invention is directed to the application of selective braking to front and rear brakes on one side of a vehicle to correct vehicle dynamic behavior after sudden tire rupture.

BACKGROUND OF THE INVENTION

After a sudden tire blowout or rupture, maintaining control of a vehicle can be very difficult. Sudden tire rupture can cause a vehicle to stray off its intended course by pulling the vehicle in the direction of the ruptured tire due to the increased drag of the deflated tire. When driving straight ahead, rupture of a front right tire may cause, for example, a vehicle to pull to the right. When driving in a left turn, rupture of the front right tire may cause sudden understeer due to the loss of front lateral force production capabilities and may cause the vehicle to move to the right of the intended left turn.

A system of controlling a vehicle after sudden tire rupture was proposed by Patwardhan et al., in *Theory and Experiments of Tire Blow-out Effects and Hazard Reduction Control for Automated Vehicle Lateral Control System*, TA1-10:40, 1207–1209 at the June 1994 proceedings of the American Control Conference. Patwardhan et al. propose bias addition to steering and engine torque reduction to overcome vehicles dynamics caused by tire rupture. The applicants have discovered that improved vehicle control can be achieved in a tire rupture scenario by varying braking torque to the various brake actuators of the vehicle.

SUMMARY OF THE INVENTION

The present invention relates to a method for selectively apply braking torque force to control the trajectory of a vehicle after sudden tire rupture. According in a first aspect of the invention, tire rupture is detected. The actual trajectory of the vehicle is then calculated and compared to the intended trajectory of the vehicle. If the actual trajectory of the vehicle is not within an acceptable range, braking torque is applied to either the left hand side or right hand side brakes, as appropriate.

According to a further aspect of the invention, total desired brake torque corrections on the front and rear brakes of the appropriate side of the vehicle are calculated. In addition, the maximum brake torque corrections on the front and rear brakes are calculated. Selective braking torque is then applied to the front and rear wheels depending on the relationship of the desired brake torque correction and the maximum brake torque correction.

Use of the foregoing techniques offers a significant advantage in dynamic vehicle control after sudden tire rupture. These and other features of the present invention may be better understood by considering the following detailed description of the invention. In the course of the description, reference is made to the attached drawings.

DETAILED DESCRIPTION

Figure 1:
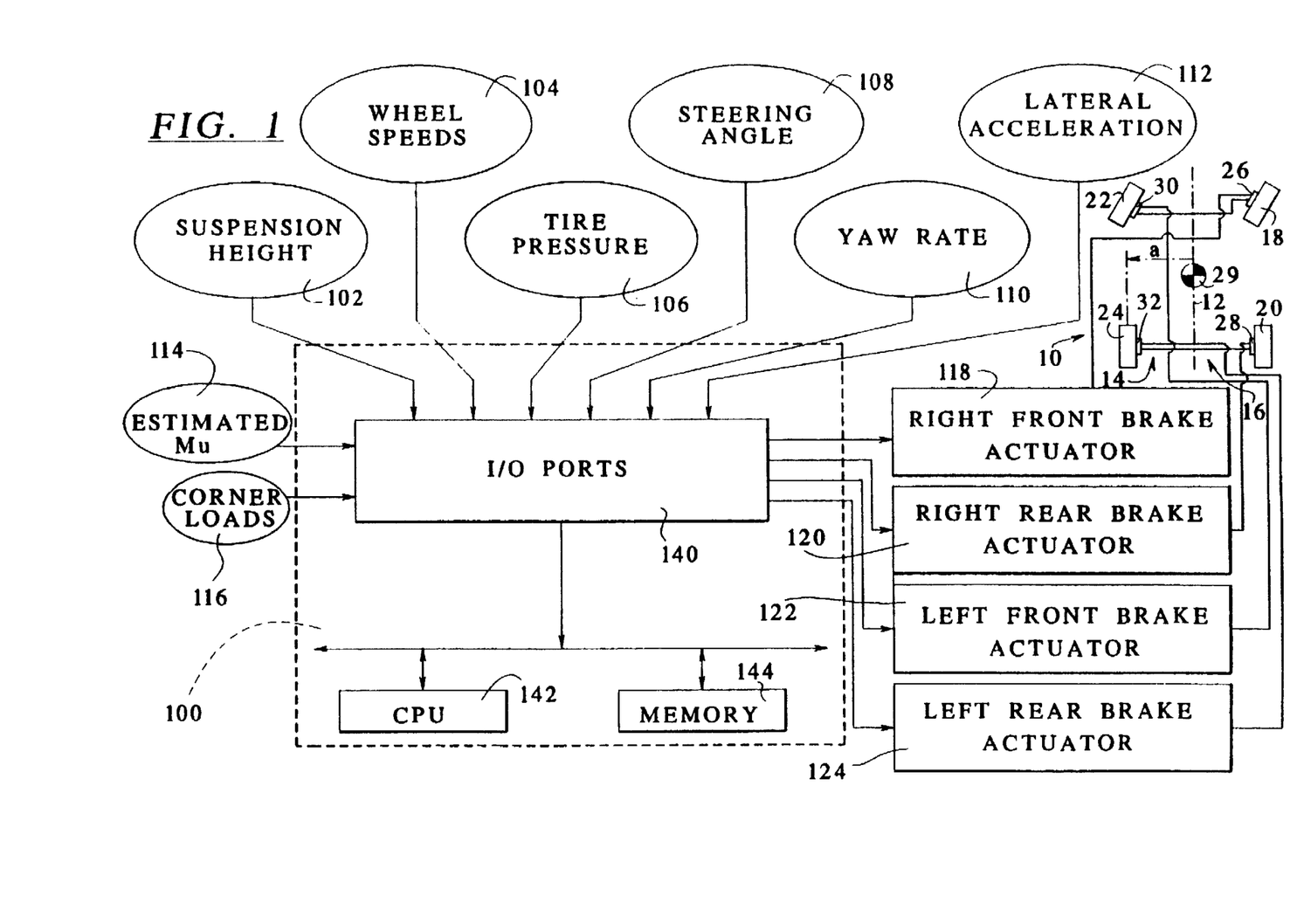
FIG. 1 is a fragmentary, schematic view of an exemplary automobile chassis in which a preferred form of the invention is implemented.

Referring to FIG. 1, an embodiment of the invention is used in an exemplary vehicle 10 defining a longitudinal axis 12 that divides the vehicle 10 into a left side 14 and right side 16. The vehicle 10 includes a right front wheel or first wheel 18 and a right front or first brake 26 that applies a braking torque to the first wheel 18 related to a right front or first brake actuator signal. Similarly, the vehicle 10 includes a right rear wheel or second wheel 20 and a right rear or second brake 28 that applies a braking torque to the second wheel 20 related to a right rear or second brake actuator signal, a left front or third wheel 22 and a left front or third brake 30 that applies a braking torque to the third wheel 22 based on a left front or third brake actuator signal, and a left rear or fourth wheel fourth 24 and a left rear or fourth brake 32 that applies a braking torque to the fourth wheel 24 based a left rear or fourth brake actuator signal.

The invention includes a conventional electronic microprocessor or controller 100 manufactured by Ford Motor Company. The controller 100 receives a plurality of input data and generates responsive signals. Inputs to the controller 100 include data corresponding to suspension height, which is calculated by known means, as shown at 102. Wheel speed sensors of known type, such as a Hall effect sensor, provide data corresponding to angular wheel speed, as seen at 104. Tire pressure data may be provided by a tire pressure sensor, as shown at 106, or a tire pressure switch. Steering angle data, as shown at 108, is measured by a conventional steering angle transducer mounted on the vehicle steering column (not shown) that provides a signal proportional to the steering angle through which the vehicle steering wheel (not shown) is moved. Actual yaw rate data, as seen at 110, corresponding to rotational velocity of the vehicle and estimated by known techniques is also provided to the controller 100. The controller 100 also receives data corresponding to lateral acceleration, as shown at 112, which is generated by known techniques such as through use of a conventional accelerometer.

Another input to the controller 100 is an estimated Mu, as seen at 114, corresponding to road surface friction. A Mu estimator block, not shown, calculates road surface friction by known techniques, such as described in U.S. Pat. No. 5,278,761. The controller may also receive data corresponding to effective corner loads generated by known techniques, as shown at 116. As is further discussed, the invention does not necessarily require each of these types of input data or may require additional data, depending on how the system determines whether a tire rupture has occurred and the particular control process employed.

The input data is provided to a CPU 142 and a memory 144 through input/output ports 140. The controller 100 is programmed to perform the method steps described in connection with FIGS. 2–5 and generate the first, second, third and fourth brake actuator signals, also referred to as actual brake torque signals, 118, 120, 122, and 124, respectively. The brake actuator signals are applied to the brakes 26, 28, 30 and 32, respectively.

Figure 2:
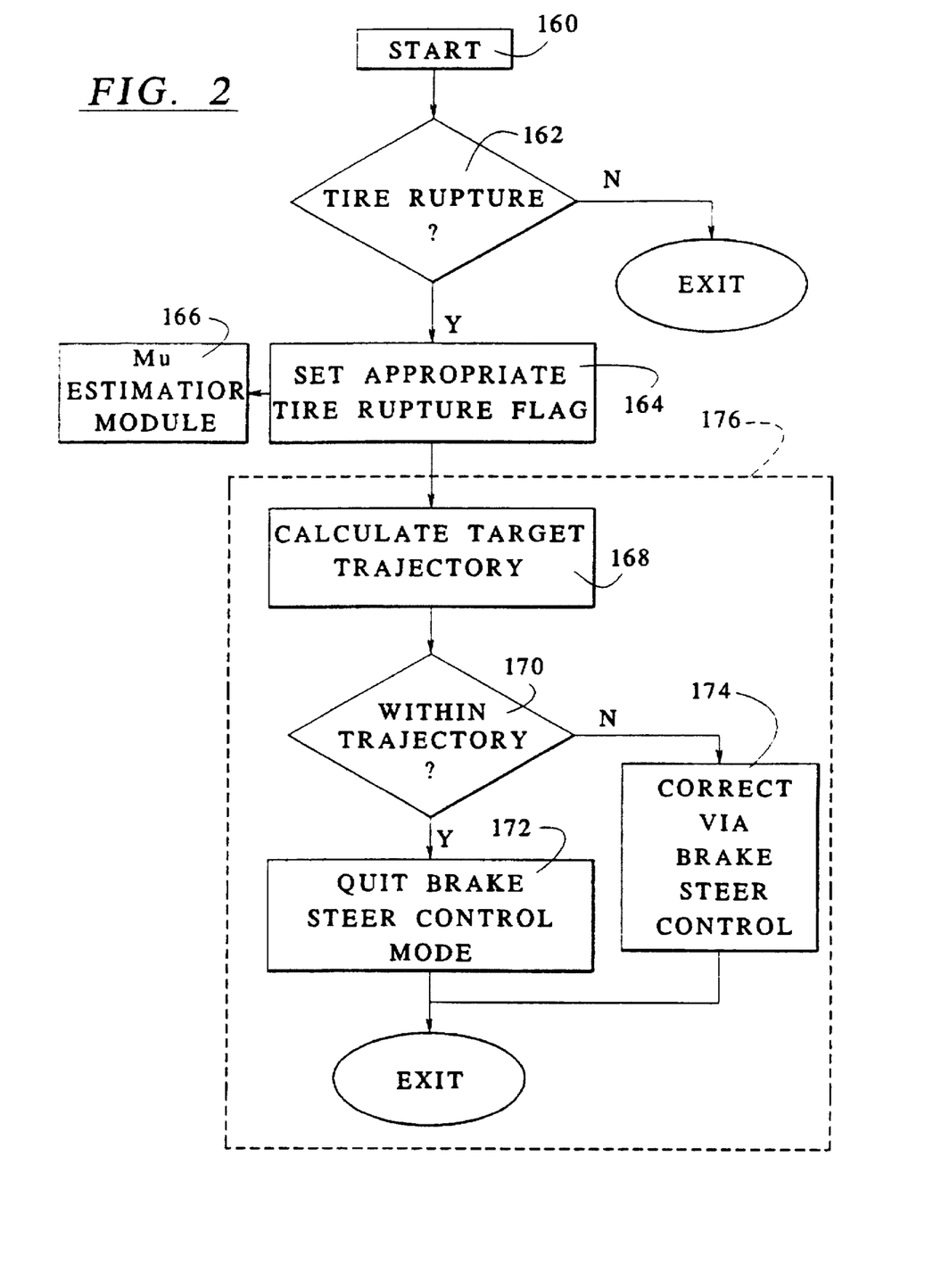
FIG. 2 is a flow diagram illustrating a controller operating in accordance with a preferred embodiment of the present invention.

FIG. 2 is a flowchart showing the operation of a preferred embodiment of the brake steer vehicle dynamics control invention. The routine is initiated at 160. Tire rupture is detected at 162 by one of several methods, such as by detection a sudden pressure drop in a tire through analysis of tire pressure data, as shown at 106 in FIG. 1. Alternatively, tire rupture can be detected by monitoring wheel speed data shown at 104, by monitoring suspension height data shown at 102, by monitoring corner load data shown at 116, or through other methods, such as by monitoring data provided by a tire pressure switch or by monitoring vehicle attitude data such as yaw, roll and pitch data. The system periodically monitors the appropriate data to detect tire rupture.

Once tire rupture is detected at 162, an appropriate tire rupture flag, $R_{RF}$, $R_{RR}$, $R_{LF}$, and/or $R_{RR}$, is set, at 164, corresponding to which of the tires is ruptured. For example, if the rupture is detected on the right front tire, $R_{RF}$ is set to 1. The Mu estimator module 166 is notified that a tire rupture flag has been set so that Mu can be recalculated taking into account that a tire is ruptured. Thus, after a tire rupture flag is set at 164, the Mu estimator module 166 is interrupted to recalculate estimated Mu.

Still referring to FIG. 2, a brake steering control module or routine 176 is then implemented. At 168, a desired or target trajectory is calculated based on a trajectory of a normal car with no tire rupture. The actual trajectory of the vehicle is also calculated, and the actual trajectory is compared to a desired trajectory range at 170. If the actual trajectory is within the acceptable range, then the brake steer control module is exited at 172. This may occur, for example, when tire rupture does not cause the vehicle to significantly deviate from the intended trajectory. If the actual trajectory is outside the acceptable range, the brake steer control routine corrects the trajectory, at 174. The brake steer control module may additionally consider whether the brake pedal is applied, and this information may be input into the brake steer control module.

Figure 3:
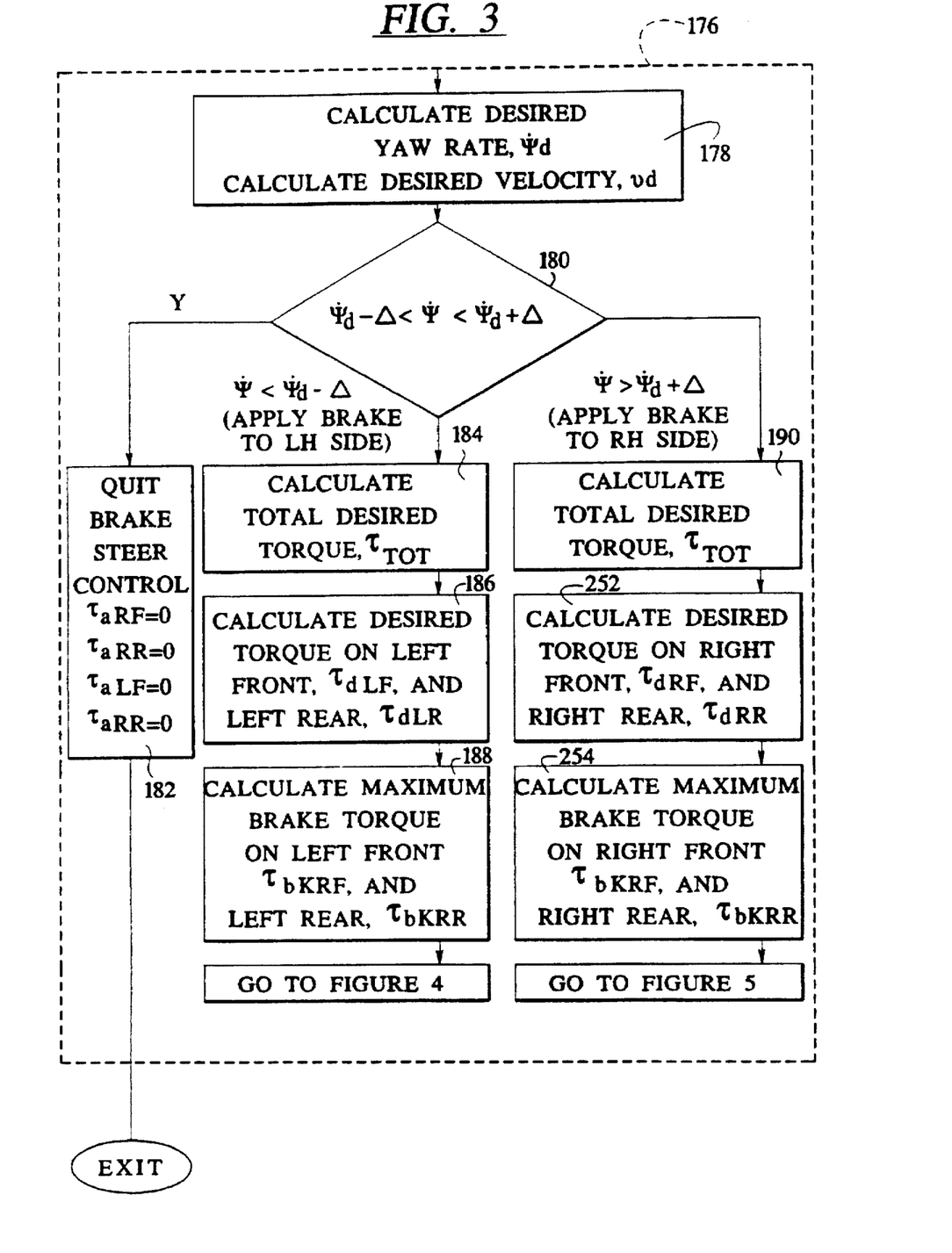
FIG. 3 is a flow diagram illustrating details of one of the steps shown in FIG. 2.

Referring to FIG. 3, the area depicted by the dashed lines 176 is the brake steering control module or routine 176 referenced in FIG. 2. The first step in the routine is calculation of desired trajectory at 178. The desired trajectory is based on a desired yaw rate, which is calculated in the following manner:

$$\dot{\Psi}_d = k\sqrt{(\mu g \delta/L)}$$

where k is a constant, g is gravitational acceleration, L is the wheel base, and $\delta$ is the steering wheel angle. Further details of this calculation are discussed in a pending U.S. patent application, Ser. No. 08/398,279, entitled "Method for Controlling Yaw of a Wheeled Vehicle," assigned to the Ford Motor Company and filed in the names D. Hrovat and M. Tran on Mar. 3, 1995. Desired lateral velocity, $v_d$, may also be calculated, as shown at 178, however in a preferred embodiment this value is zero.

A predetermined value, $\Delta$, is then added and subtracted from the desired yaw rate to generate a desired yaw rate range. The actual yaw rate is then compared to the desired yaw rate range at 180. If the desired yaw rate is within the acceptable range, then the brake steer control module is exited at 182. In exiting the module, the first, second, third and fourth brake actuator signals, 118, 120, 122, and 124, respectively, are set to zero, and the routine causes no brake torque to be applied to the first, second, third and fourth brakes, 26, 28, 30, and 32, respectively.

Figure 4:
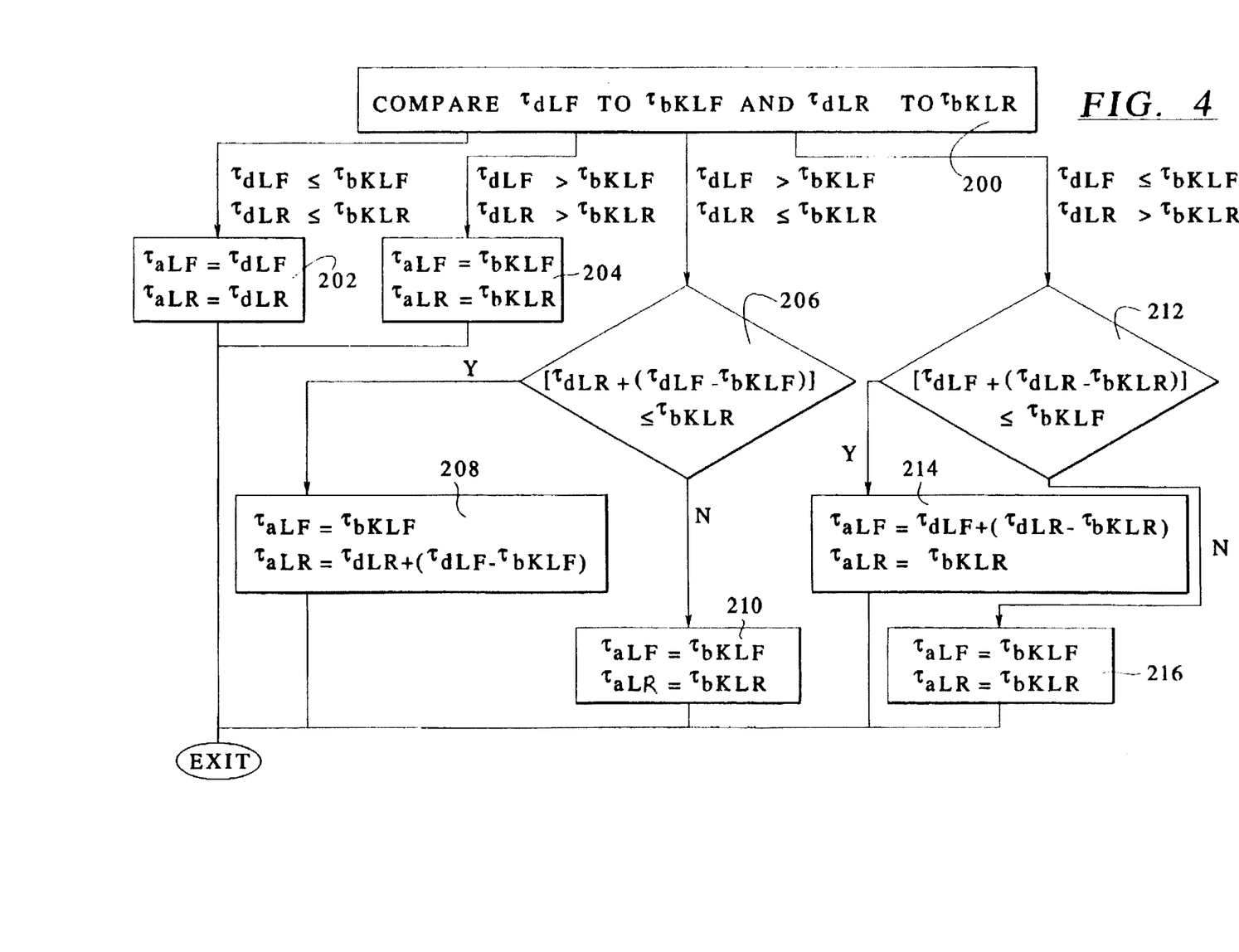
FIG. 4 is a flow diagram illustrating details of one of the steps shown in FIG. 2.
Figure 5:
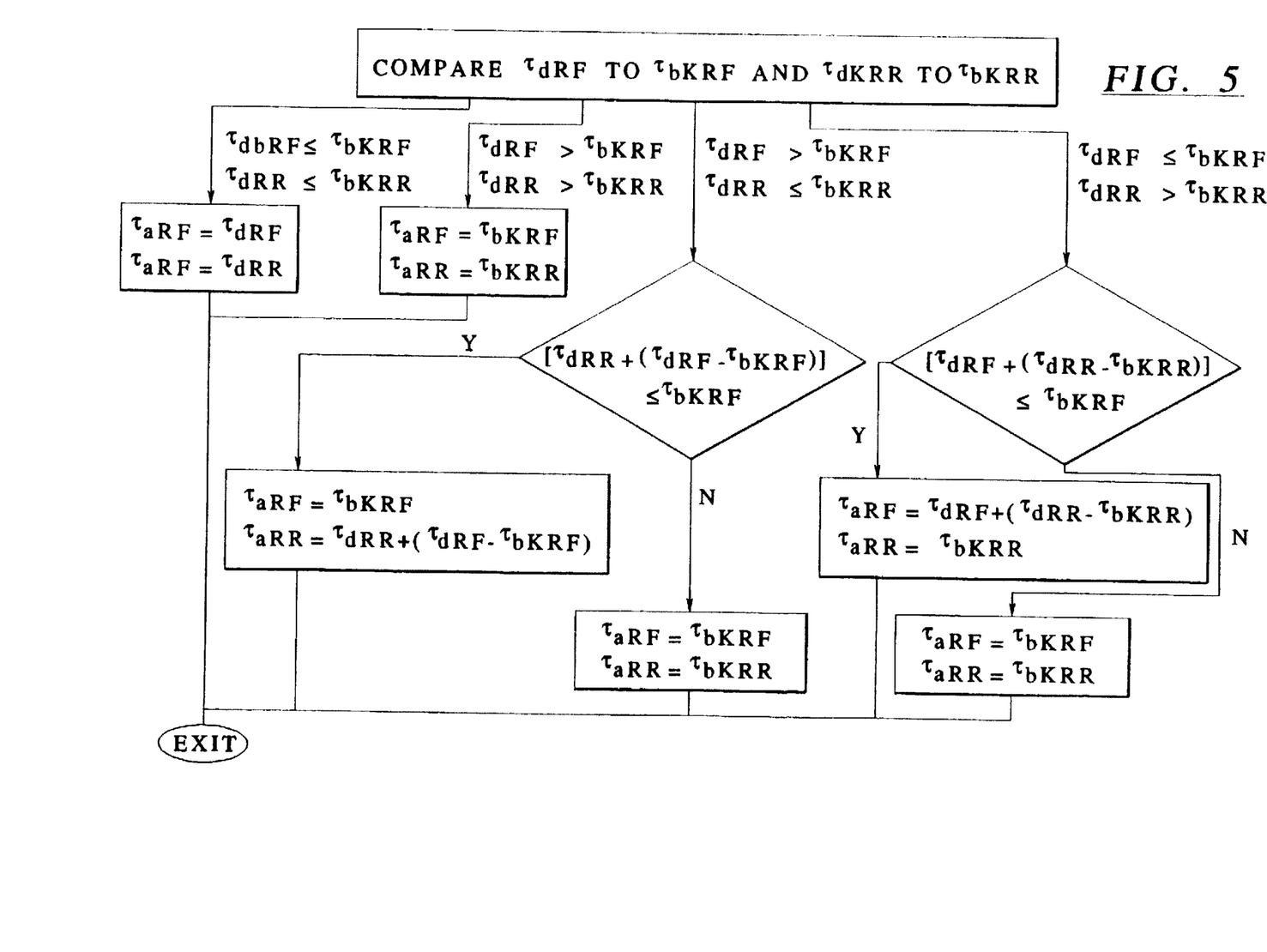
FIG. 5 is a flow diagram illustrating details of one of the steps shown in FIG. 2.

If the actual yaw rate falls below the acceptable yaw rate range, then it is necessary to apply the brakes to the left side of the vehicle, following the path shown at 184. If the actual yaw rate exceeds the acceptable yaw rate range, then it is necessary to apply the brakes to right side of the vehicle, following the path shown at 190. As depicted in FIGS. 3, 4 and 5, similar methodology is followed along both of these two paths. For purposes of this description, it will be assumed that it is necessary to apply brakes to the left side of the vehicle, following the path starting at 184.

First, total desired torque correction, $\tau_{TOT}$, is calculated at 184. The total desired torque correction is a function of the yaw rate error, lateral velocity error, $v-v_d$, effective left front corner load, $F_{ZLF}$, and effective left rear corner load, $F_{ZLR}$:

$$\tau_{TOT} = (\dot{\Psi} - \dot{\Psi}_d, v - v_d, F_{ZLF}, F_{ZLR})$$

As previously noted, in a preferred embodiment the desired lateral velocity, $v_d$, is zero.

Next, at 186, the total desired brake torque correction is used to calculate front and rear components of the total desired torque correction $\tau_{dLF}$, and $\tau_{dLR}$, respectively. The total desired brake torque correction on the left front is calculated according to the relationship:

$$\tau_{dLF} = \frac{F_{ZLF} + F_{ZLR} * R_{LR}}{F_{ZLF} + F_{ZLR}} * \tau_{TOT}(1 - R_{LF}) * \frac{r}{a}$$

In this calculation, a is the distance form the vehicle center of mass, as shown at 29 in FIG. 1, and r is the wheel loaded or effective radius. In this calculation, if the left front tire is ruptured, for example, then the corresponding flag $R_{LF}$ is set to 1, so that $\tau_{dLF}$ becomes zero because that tire is ruptured.

$$\tau_{dLR} = \frac{F_{ZLR} + F_{ZLF} * R_{LF}}{F_{ZLF} + F_{ZLR}} * \tau_{TOT}(1 - R_{LR}) * \frac{r}{a}$$

Similarly, the total desired brake torque correction on the left rear is calculated according to the relationship:

Next, at 188, the maximum brake torque correction that can be applied to the left front and left rear tire is calculated, as a function of estimated Mu, vehicle speed, u, and corner loads, $F_{ZLF}$ and $F_{ZLR}$:

$$\tau_{bkLF} = (l - R_{LF})(\mu, u, F_{ZLF})$$

$$\tau_{bkLR} = (l - R_{LF})(\mu, u, F_{ZLR})$$

This calculation determines, in effect, the maximum brake force correction that can be applied without locking up the wheels during braking. This can be obtained from empirical tire braking data and estimates of current torque, as set forth in Ser. No. 08/398,279, entitled "Method for Controlling Yaw of a Wheeled Vehicle," assigned to the Ford Motor Company and filed in the names D. Hrovat and M. Tran on Mar. 3, 1995. The maximum brake torque correction is set to zero if the tire rupture flag is set to 1 because that tire is ruptured.

Referring next to FIG. 4, at 200, the front desired brake torque correction, $\tau_{dLF}$, is compared to the front maximum brake torque correction, $\tau_{bkLF}$, and the rear desired brake torque correction, $\tau_{dLR}$, is compared to the rear maximum brake torque correction $\tau_{bkLR}$. Four outcomes are possible.

At 202, the desired left front torque correction is less than or equal to the maximum left front torque correction and the desired left rear torque correction is less than or equal to the maximum left rear torque correction, in other words, $\tau_{dLF} \leq \tau_{bkLF}$ and $\tau_{dLR} \leq \tau_{bkLR}$. Thus, there is no need to limit the brake torque correction applied to the front and rear brakes. Accordingly, the actual brake torque signals are set equal to the desired brake torque correction values:

$$\tau_{aLF} = \tau_{dLF}, \text{ and}$$

$$\tau_{aLR} = \tau_{dLR}.$$

At 204, the desired left front torque correction is greater than the maximum left front torque correction and the desired left rear torque correction is greater than the maximum left rear torque correction, in other words, $\tau_{dLF} > \tau_{bkLF}$ and $\tau_{dLR} > \tau_{bkLR}$. In this case, although greater braking torque is desired, the actual braking torque is limited, to prevent skid, to the maximum brake torque correction:

$$\tau_{aLF} = \tau_{bkLF}, \text{ and}$$

$$\tau_{aLR} = \tau_{bkLR}.$$

At 206, the desired left front torque correction is greater than the maximum left front torque correction and the desired left rear torque correction is less than or equal to the maximum left rear torque correction, in other words, $\tau_{dLF} > \tau_{bkLF}$ and $\tau_{dLR} \leq \tau_{bkLR}$. In this case, the actual braking torque to the left front brake is limited to the left front maximum brake torque correction, although additional front braking torque, $\tau_{dLF} - \tau_{bkLF}$, is desired. However, the maximum brake torque correction that can be applied to the left rear brake exceeds the desired brake torque correction for that brake so additional brake torque can be applied to that brake. To determine the amount of brake torque that should be applied to the left rear brake, the maximum brake torque correction for the left rear brake, $\tau_{bkLR}$ is compared to the desired left rear brake torque correction, $\tau_{dLR}$, plus the additional desired braking torque correction on the front brake, $\tau_{dLF} - \tau_{bkLF}$. If $\tau_{bkLR} \geq \tau_{dLR} + (\tau_{dLF} - \tau_{bkLF})$, then, at 208, the additional desired front braking torque is applied to the rear brake, such that:

$$\tau_{aLF} = \tau_{bkLF}, \text{ and}$$

$$\tau_{aLR} = \tau_{dLR} + (\tau_{dLF} - \tau_{bkLF}).$$

If $\tau_{bkLR} > \tau_{dLR} + (\tau_{dLF} - \tau_{bkLF})$, then, at 210, the maximum brake torque correction that should be applied to the rear brake is $\tau_{bkLR}$, such that:

$$\tau_{aLF} = \tau_{bkLF}, \text{ and}$$

$$\tau_{aLR} = \tau_{bkLR}.$$

At 212, the desired left front torque correction is less than or equal to the maximum left front torque correction and the desired left rear torque correction is greater than the maximum left rear torque correction, in other words, $\tau_{dLF} \leq \tau_{bkLF}$ and $\tau_{dLR} > \tau_{bkLR}$. In this case, the actual braking torque to the left rear brake is limited to the left rear maximum brake torque correction, although additional rear braking torque, $\tau_{dLR} - \tau_{bkLR}$, is desired. However, the maximum brake torque correction that can be applied to the left front brake exceeds the desired brake torque correction for that brake so additional brake torque can be applied to that brake. To determine the amount of brake torque correction that should be applied to the left front brake, the maximum brake torque correction for the left front brake, $\tau_{bkLF}$ is compared to the desired left front brake torque correction, $\tau_{dLF}$, plus the additional desired braking torque on the rear brake, $\tau_{dLR} - \tau_{bkLR}$. If $\tau_{bkLF} \geq \tau_{dLF} + (\tau_{dLR} - \tau_{bkLR})$, then, at 214, the additional desired front braking torque is applied to the rear brake, such that:

$$\tau_{aLF} = \tau_{dLF} + (\tau_{dLR} - \tau_{bkLR}), \text{ and}$$

$$\tau_{aLR} = \tau_{bkLR}.$$

If $\tau_{bkLF} < \tau_{dLF} + (\tau_{dLR} - \tau_{bkLR})$, then, at 216, the maximum brake torque correction that should be applied to the rear brake is $\tau_{bkLF}$, such that:

$$\tau_{aLF} = \tau_{bkLF}, \text{ and}$$

$$\tau_{aLR} = \tau_{bkLR}.$$

The processor 100 then provides the appropriate third and fourth brake actuator signals, 122 and 124, to the brakes 30 and 32, respectively, correcting vehicle dynamic behavior after sudden tire rupture.

Referring back to FIG. 3, it is seen that if, at step 180, the routine determines that the brakes should be applied to the right side of the vehicle 10, then the appropriate steps are executed to generate total desired torque correction, as shown at 190, desired torque correction on the right front and right rear, as shown at 252, and maximum brake torque correction on the right front and right rear, as shown at 254. The system then continuing in FIG. 5 in a manner similar to that described above for FIG. 4.

Alternative embodiments of the invention may include the step of slowing the vehicle by braking. For example, referring to FIG. 2, after correcting the trajectory at 174, a step may be implemented to apply the brakes to slow the vehicle to a stop. A more aggressive strategy can include the additional step of sensing whether the acceleration pedal of the vehicle is depressed. Referring again to FIG. 2, if at 170 it is determined that the vehicle is within the desired trajectory, then an acceleration pedal sensor senses whether the accelerator is depressed. if the accelerator is not depressed, then braking torque is applied to slow the vehicle to a stop. If the accelerator is depressed, then the vehicle is not slowed to a stop by the system. In other words, the driver only retains control of the vehicle if the accelerator pedal is depressed. This situation may occur, for example, when the driver is in an emergency situation and is depressing the accelerator, for example, to remain ahead of a following vehicle or to avoid an obstacle, and thus it is necessary to permit the driver to maintain control of the vehicle.

In a situation of multiple tire ruptures on the same side, for example both right hand side tires, the brakes on the other side, in this case the left side of the vehicle, could still be used. If tire ruptures occurred on opposite sides of the vehicle, then the system applies braking torque to the appropriate non ruptured tires depending on the desired trajectory. If tire rupture occurs while braking, the brake steering control routine is reconfigured similarly to a passive yaw control, additionally taking into account the ruptured tire and applying the brake steering control only to tires that are not ruptured.

For front-wheel-drive vehicles, rupture of a non-driven (rear) tire should primarily be counteracted by controlling the diagonally opposite front tire. With the rupture of a rear tire in a rear-wheel-drive vehicle, it is possible to control the opposite rear tire to reduce the driving torque while increasing lateral force production capabilities. This change in proportioning of control techniques can be incorporated by modifying the effective corner loads. In the case of front wheel tire rupture, similar modifications can be made.

It is to be understood that the specific mechanisms and techniques that have been described are merely illustrative of one application of the principles of the invention. Numerous modifications, additions and substitutions may be made to the methods and apparatus without departing from the true spirit and scope of the invention.

What is claimed is:

1. A method of controlling brakes on a vehicle after sudden tire rupture, said vehicle including a plurality of wheels and brakes corresponding to said wheels, said brakes responding to a plurality of brake actuator signals and said brakes applying a braking torque to said wheels corresponding to said brake actuator signals, said method comprising, in combination, the steps of:

generating a tire rupture signal indicative of whether a tire on said vehicle has ruptured;

generating a first trajectory signal corresponding to a desired trajectory of said vehicle;

generating a second trajectory signal corresponding to an actual trajectory of said vehicle in response to said tire rupture signal; and comparing said first trajectory signal to said second trajectory signal and generating responsive brake actuator signals whereby the braking of said vehicle is selectively controlled to alter said actual trajectory of said vehicle.

2. A method, as claimed in claim 1, wherein the step of comparing said first trajectory signal to said second trajectory signal comprises the step of selecting a right side or left side of said vehicle for selective application of said brake actuator signals.

3. A method, as claimed in claim 2, wherein the step of comparing said first trajectory signal to said second trajectory signal further includes the step of selecting a front and a rear brake of said vehicle for selective application of said brake actuator signals.

4. A method of controlling trajectory of a vehicle after sudden tire rupture, said vehicle including a right side and a left side, said right side including a right front portion with a first wheel and a first brake, and a right rear portion with a second wheel and a second brake, said first brake and said second brake comprising a right brake pair, said left side including a left front portion with a third wheel and a third brake, and a left rear portion with a fourth wheel and a fourth brake, said third brake and said fourth brake comprising a left brake pair, said method comprising, in combination, the steps of:

generating a tire rupture signal indicative of whether a tire on any of the first wheel, second wheel, third wheel and fourth wheel has ruptured generating an actual trajectory value indicative of the trajectory of said vehicle in response to said tire rupture signal;

generating a desired trajectory range indicative of a desirable trajectory of said vehicle; and responding to said actual target trajectory value being outside of said desired trajectory range by controlling the braking of one of said brake pairs.

5. A method, as claimed in claim 4, wherein the step of controlling the braking of one of said brake pairs comprises the steps, in combination, of:

selecting one of said brake pairs as a selected brake pair for application of brake actuator signals;

generating a first signal corresponding to a total desired torque correction on said vehicle;

generating a second signal corresponding to a total desired torque correction on a front brake of said selected brake pair;

generating a third signal corresponding to a total desired torque correction on a rear brake of said selected brake pair;

generating a fourth signal corresponding to a maximum brake torque correction on said front brake of said selected brake pair;

generating a fifth signal corresponding to a maximum brake torque correction on said rear brake of said selected brake pair; and generating a sixth signal and a seventh signal each corresponding to said second, third, fourth and fifth signals, said sixth and seventh signals applied to said front and rear brake of said selected brake pair, respectively.

6. A method, as claimed in claim 4, wherein the step of generating said sixth and seventh signals comprises the steps of:

equating said sixth signal with said second signal and equating said seventh signal with said third signal if said second signal is less than or equal to said fourth signal and said third signal is less than or equal to said fifth signal;

equating said sixth signal with said fourth signal and equating said seventh signal with said fifth signal if said second signal is greater than said fourth signal and said third signal is greater than said fifth signal;

equating said sixth signal with said fourth signal if said second signal is greater than said fourth signal and said third signal is less than or equal to said fifth signal;

equating said seventh signal with said third signal plus the sum of said second signal minus said fourth signal if said fifth signal is greater than or equal to said third signal plus said second signal minus said fourth signal;

equating said seventh signal with said fifth signal if said fifth signal is less than said third signal plus said second signal minus said fourth signal;

equating said seventh signal with said fourth signal if said second signal is less than or equal to said fourth signal and said third signal is greater than said fifth signal;

equating said sixth signal with said second signal plus said third signal minus said fifth signal if said fourth signal is greater than or equal to said second signal plus said third signal minus said fifth signal; and equating said sixth signal with said fourth signal if said fourth signal is less than said second signal plus said third signal minus said fifth signal.

7. A method, as claimed in claim 4, wherein the step of generating said tire rupture signal comprises the steps, in combination, of:

periodically generating a pressure signal representative of tire pressure;

generating a comparison signal representative of the difference between said pressure signal and a previously generated pressure signal; and detecting a comparison signal that exceeds a predetermined value.

8. A method, as claimed in claim 4, wherein the step of generating said tire rupture signal comprises the steps, in combination, of:

generating an attitude signal representative of said vehicle attitude; and generating a tire rupture signal if said attitude signal is outside a predetermined range.

9. A method, as claimed in claim 4, wherein the step of generating said tire rupture signal comprises the steps, in combination, of:

generating a load signal representative of corner load on said vehicle; and generating a tire rupture signal if said load signal is outside a predetermined range.

10. A method of controlling braking on a vehicle after sudden tire rupture, said vehicle including a front portion and a rear portion and a right side and a left side, said left side including a left brake pair with a front brake and a rear brake, said right side including a right brake pair with a front brake and a rear brake, said method comprising, in combination, in response to detecting a rupture of a tire on a wheel at any said portion of the vehicle, the steps of:

determining a selected brake pair corresponding to which of said left brake pair and said right brake pair should be selected;

generating a first signal indicative of a desired torque correction on said front brake of said selected brake pair;

generating a second signal indicative of a desired torque correction on said rear brake of said selected brake pair;

generating a third signal indicative of a maximum brake torque correction on said front brake of said selected brake pair;

generating a fourth signal indicative of a maximum brake torque correction on said rear brake of said selected brake pair;

generating a first relational value having one of at least two preset values by comparing said first signal and said third signal;

generating a second relational value having one of at least two preset values by comparing said second signal and said fourth signal;

generating a first torque actuator signal and a second torque actuator signal corresponding to said first relational value and said second relational value, respectively; and controlling said selected brake pair by applying said first torque actuator signal to said front brake of said selected brake pair and applying said second torque actuator signal to said rear brake of said selected brake pair, whereby vehicle trajectory is controlled.

11. A method, as claimed in claim 10, further comprising the step of slowing said vehicle to a stop.

12. A method, as claimed in claim 10, further comprising the steps, in combination, of:

generating an accelerator signal corresponding to whether an accelerator pedal of said vehicle has been depressed;

slowing said vehicle to a stop in response to said accelerator signal.

* * * * *